(12) United States Patent
Krimstock et al.

(10) Patent No.: US 11,528,365 B1
(45) Date of Patent: Dec. 13, 2022

(54) FACILITATION OF COMMUNICATION AMONG INDIVIDUALS WAITING IN A CONTACT CENTER QUEUE

(71) Applicant: Avaya Management L.P., Durham, NC (US)

(72) Inventors: Roger I. Krimstock, Boulder, CO (US); Kevin Archer, Brighton, CO (US); Rusty Gerald Nelson, Brighton, CO (US); Gregory Paul Schin, Louisville, CO (US); Dwayne W. Ockel, Northglenn, CO (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/490,202

(22) Filed: Sep. 30, 2021

(51) Int. Cl.
*H04M 3/523* (2006.01)
*H04M 3/51* (2006.01)

(52) U.S. Cl.
CPC ....... *H04M 3/5232* (2013.01); *H04M 3/5133* (2013.01)

(58) Field of Classification Search
CPC ...... H04M 3/51; H04M 3/5133; H04M 3/523; H04M 3/5232

USPC .................................................. 379/266.01
See application file for complete search history.

(56) References Cited

U.S. PATENT DOCUMENTS

| | | | |
|---|---|---|---|
| 6,430,537 B1 | 8/2002 | Tedesco et al. | |
| 6,801,520 B2 | 10/2004 | Philonenko | |
| 6,880,028 B2 | 4/2005 | Kurth | |
| 8,340,277 B2 | 12/2012 | Kradjel et al. | |
| 2002/0067823 A1* | 6/2002 | Walker | H04M 3/428 379/266.01 |
| 2008/0260138 A1* | 10/2008 | Chen | H04M 3/5238 379/215.01 |

* cited by examiner

*Primary Examiner* — Harry S Hong

(57) ABSTRACT

The technology disclosed herein enables communications among users having communication session requests waiting in a queue. In a particular embodiment, a method includes determining that a first communication session request from a first endpoint is in a queue for establishing a communication session with a receiving endpoint to which the queue is regulating access. While the first communication session request is in the queue, the method includes connecting the first endpoint to a communication channel between the first endpoint and a second endpoint having a second communication session request in the queue. Also, while the first communication session request is in the queue, the method includes exchanging user communications between the first endpoint and the second endpoint over the communication channel.

20 Claims, 12 Drawing Sheets

FACILITATION OF COMMUNICATION AMONG INDIVIDUALS WAITING IN A CONTACT CENTER QUEUE

TECHNICAL BACKGROUND

Callers waiting, longer than expected, or tolerated, for an agent can have a negative experience, and may give up, resulting in abandoned calls and possible loss of business. Callers may feel out of control while waiting too long for an agent, which leads to dissatisfied customers. Even if a customer chooses to wait, by the time they eventually receive service, they can be angry, frustrated, etc., making the interaction negative even if the contact was not abandoned. While features have been tried that are designed to address the caller experience when waiting in queues (e.g., choice of music while waiting), long wait times remain negative experiences for callers.

SUMMARY

The technology disclosed herein enables communications among users having communication session requests waiting in a queue. In a particular embodiment, a method includes determining that a first communication session request from a first endpoint is in a queue for establishing a communication session with a receiving endpoint to which the queue is regulating access. While the first communication session request is in the queue, the method includes connecting the first endpoint to a communication channel between the first endpoint and a second endpoint having a second communication session request in the queue. Also, while the first communication session request is in the queue, the method includes exchanging user communications between the first endpoint and the second endpoint over the communication channel.

In some embodiments, the second endpoint is one of multiple other endpoints having communication session requests in the queue and the communication channel connects the first endpoint to the multiple other endpoints. In those embodiments, the method may include presenting a first user of the first endpoint with a graphical interface that identifies the multiple other endpoints and receiving a selection of the second endpoint from the first user via the graphical interface.

In some embodiments, the method includes receiving an offer from a first user of the first endpoint. The offer indicates consideration that the first user is willing to provide a second user of the second endpoint in exchange for a position of the second communication session request in the queue. In those embodiments, in response to receiving an indication from the second endpoint that the second user has accepted the offer, the method may include moving the first communication session request into the position of the second communication session request in the queue. Moving the first communication session request may include swapping queue positions between the first communication session request and the second communication session request. Also, in the above embodiments, the method may include presenting the first user with a graphical interface to input the offer via the first endpoint.

In some embodiments, the method includes selecting the second endpoint for the communication channel based on the first communication session request and the second communication session request both being associated with a similar topic.

In some embodiments, in response to determining that the first communication session request is next for removal from the queue, the method includes presenting a first user of the first endpoint with an option to keep the first communication session request in the queue. In those embodiments, the method may include, in response to the first user selecting the option, continuing to exchange the user communications between the first endpoint and the second endpoint over the communication channel.

In another embodiments, an apparatus is provided having one or more computer readable storage media and a processing system operatively coupled with the one or more computer readable storage media. Program instructions stored on the one or more computer readable storage media, when read and executed by the processing system, direct the processing system to determine that a first communication session request from a first endpoint is in a queue for establishing a communication session with a receiving endpoint to which the queue is regulating access. While the first communication session request is in the queue, the program instructions direct the processing system to connect the first endpoint to a communication channel between the first endpoint and a second endpoint having a second communication session request in the queue. Also, while the first communications session request is in the queue, the program instructions direct the processing system to exchange user communications between the first endpoint and the second endpoint over the communication channel.

DETAILED DESCRIPTION

The wait treatment systems described herein provide a mechanism for callers to communicate with one another while waiting in a queue for their call to be connected to a called party, such as an agent of a contact center or other entity that may utilize a call queue. If the callers are able to communicate with one another while in the queue, it is possible that the callers may be able to assist one another. By assisting one another, the load on the called party may be alleviated and negative waiting experiences for callers may be avoided. For example, a caller may have some or all of their questions answered by someone else waiting in the call queue and may, therefore, end their call to free up their position in the queue for someone else or spend less time with the called party once they are selected from the queue for connection to the called party.

Figure 1:
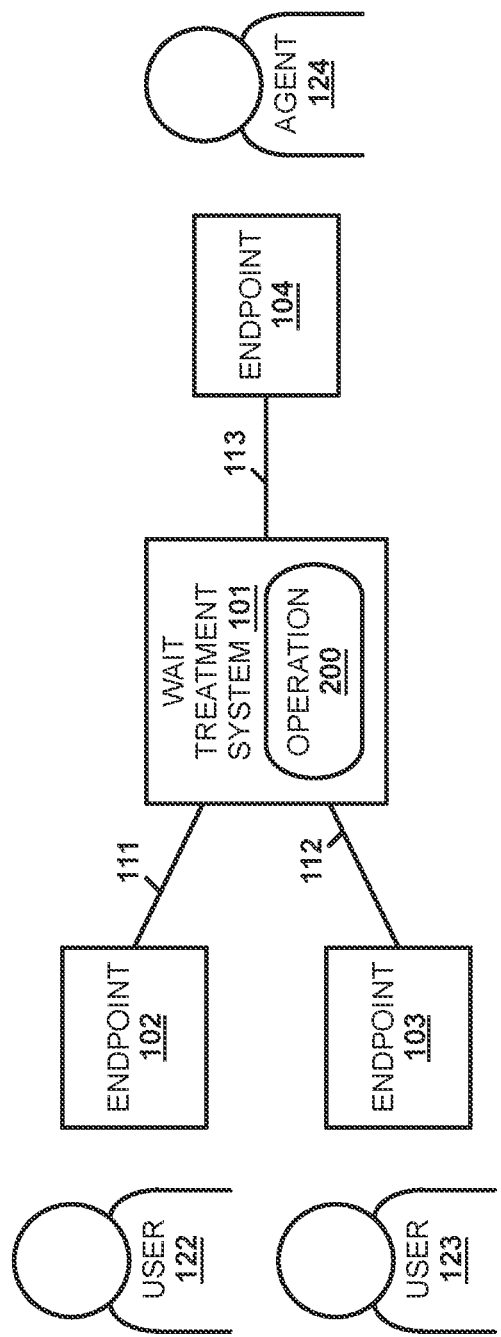
FIG. 1 illustrates an implementation for connecting endpoints of users waiting in a queue.

FIG. 1 illustrates implementation 100 for connecting endpoints of users waiting in a queue. Implementation 100 includes wait treatment system 101, endpoint 102, endpoint 103, and endpoint 104. Endpoint 102 and wait treatment system 101 communicate over communication link 111. Endpoint 103 and wait treatment system 101 communicate over communication link 112. Endpoint 104 and wait treatment system 101 communicate over communication link 113. Communication links 111-112 are shown as direct links but may include intervening systems, networks, and/or devices.

In operation, endpoint 102 is operated by user 122, endpoint 103 is operated by user 123, and endpoint 104 is operated by agent 124. Endpoints 102-104 may each respectively be a telephone, tablet computer, laptop computer, desktop computer, conference room system, or some other type of user operable computing system. Wait treatment system 101 is a computing system (e.g., server or collection of servers) that establishes communication channels between endpoints with communication session requests waiting in a queue to be connected to endpoint 104. The communication sessions being requested may be voice, video, text chat, or some other type of real-time mode for enabling users to converse with one another—including combinations thereof. The communication session requests may be telephone calls (initiated over circuit switched or packet switched networks), internet/web-based calls (e.g., using Session Initiation Protocol (SIP), Web Real-time Communications (WebRTC), or some other protocol), or some other type of real-time communication request— including combinations thereof. In this example, wait treatment system 101 also handles the queueing of the session requests, although, in other examples, a separate system (e.g., an automatic call distributer) may maintain the queue.

Figure 2:
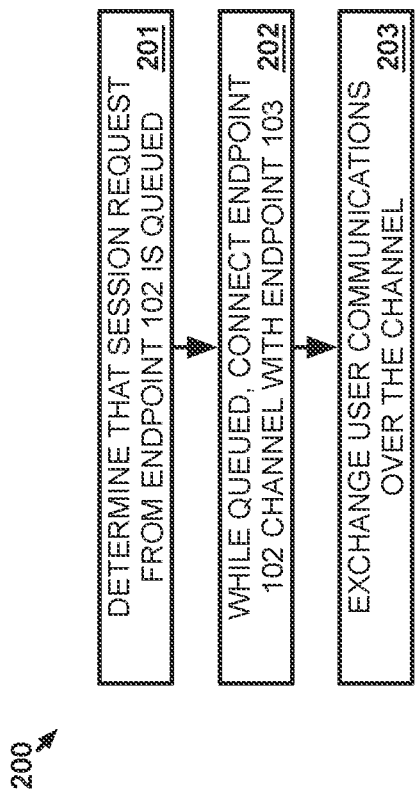
FIG. 2 illustrates an operation to connect endpoints of users waiting in a queue.

FIG. 2 illustrates operation 200 to connect endpoints of users waiting in a queue. In operation 200, wait treatment system 101 determines that a communication session request from endpoint 102 is in a queue (201). The queue is for establishing a communication session with a receiving endpoint 104 to which the queue is regulating access. For example, it is typical that agent 124 can only handle one communication session at a time. As such, the queue is used to ensure that, while a communication session is already ongoing with endpoint 104 (or endpoint 104 is otherwise not available to accept a new session), new communication session requests are held and serviced individually when endpoint 104 is ready (e.g., when endpoint 104 ends a previous session). In this example, there is only one possible receiving endpoint to which the queue regulates session access. In other examples, such as one with a contact center having multiple agents, the queue may regulate access to more than one endpoint. As such, endpoint 104 may represent any one of the multiple endpoints in those examples. If wait treatment system 101 maintains the queue itself, then wait treatment system 101 may determine that the session request from endpoint 102 is in the queue when wait treatment system 101 places endpoint 102 in the queue. If wait treatment system 101 is not the system that maintains the queue, then wait treatment system 101 may interact with that system (e.g., using Application Programming Interfaces (APIs)) to obtain information indicating that the session request is in the queue and otherwise coordinate with that system (e.g., to provide instructions on managing the queue and receive call metrics, such as estimated wait times, current waiting time, etc.). Since wait treatment system 101 did not receive the communication session request initially, the information may also include information necessary for wait treatment system 101 to establish the communication channel (e.g., may include a network address of endpoint 102 or, in the case of a phone call, the call may be managed, at least in part, by wait treatment system 101 while the call's position in the queue is maintained).

While the communication session request from endpoint 102 is in the queue, wait treatment system 101 connects endpoint 102 to a communication channel between endpoint 102 and endpoint 103, which also has a communication session request in the queue (202). The communication channel is any type of mechanism that enables endpoint 102 and endpoint 103 to exchange user communications of user 122 and user 123. The communication channel may include a communication session established between endpoint 102 and endpoint 103 (e.g., voice, video, text chat, etc.). Regardless of the type of communications, wait treatment system 101 exchanges user communications between the first endpoint and the second endpoint over the communication channel (203). For example, wait treatment system 101 may establish a voice communication channel between endpoint 102 and endpoint 103 that allows user 122 and user 123 to speak with one another while waiting in the queue. In another example, wait treatment system 101 may establish a chat channel between endpoint 102 and endpoint 103 that allows user 122 and user 123 to participant in a text conversation with one another. A chat channel may not be feasible depending on the type of endpoint involved or the manner in which endpoint 102 requested the communication session (e.g., via regular phone call). Therefore, wait treatment system 101 may determine whether an endpoint is capable of connecting via a particular type of communication channel before attempting to establish the channel. Also, since a user may have multiple endpoints, wait treatment system 101 may not simply assume that every endpoint has the same capabilities.

In some examples, more than the two users shown in implementation 100 have communication session requests waiting in the queue. The communication channel established by wait treatment system 101 may also include endpoints of one or more of those additional users. For instance, the communication channel may be a conference call session between the endpoints or a chat room to which the endpoints are connected.

In some cases, wait treatment system 101 may analyze characteristics of the communication session requests in the queue to select endpoints for the communication channel. As such, more than one communication channel may be established between different subsets of endpoints having session requests in the queue (e.g., one communication channel may be established between endpoint 102 and endpoint 103 while another communication channel is established between other endpoints) and some queued session requests may simply require the user to wait without connecting with other users (e.g., due to wait treatment system 101 not finding one or more other endpoints that would be suitable for a communication channel). The characteristics for session request from a user may include a topic for discussion (e.g., tech support, sales, product information, etc.), a history of the user when participating over past communication channels (e.g., was the user helpful or was the user able to get help), an indicated intent of the user (e.g., what the user hopes to accomplish on the requested session), or some other type of information relevant to whether users should be on the same communication channel (e.g., the users will be productive or compatible with each other). The characteristics may be received from the user when the communication session request is received (e.g., using an interactive response system) or may be received from some other source. In some examples, a machine learning algorithm may be trained to provide artificial intelligence that is employed by wait treatment system 101 to determine which users should participate over which communication channels. In the present example, wait treatment system 101 may determine that endpoint 102 and endpoint 103 should be on a communication channel because they are calling for information about the same product. It is possible that, when conversing with each other about the product over the communication channel, user 122 and user 123 may be able to answer some of the questions each other has so that agent 124 does not have to answer them later on. If all questions can be answered for either user 122 or user 123, then that user may even drop their communication session request and free up their position in the queue for those behind in the queue to move up.

Rather than automatically connecting endpoint 102 to endpoint 103, in some examples, wait treatment system 101 may notify user 122 through endpoint 102 about the communication channel with endpoint 103 (e.g., may display a visual alert and/or play an audio message). That notification may provide user 122 with the option to accept or decline the communication channel. User 123 may similarly be notified if endpoint 103 is not already connected to the communication channel (e.g., the communication channel may be already established between endpoint 103 and one or more other queued endpoints and, therefore, may have already been notified). In some cases, wait treatment system 101 may provide user 122 with information about potential users to which they can be connected using a communication channel. For instance, wait treatment system 101 may present a buddy list-type display that lists other users to which a communication channel can be established. That display may show information about each user so that user 122 can better determine with which user(s) they want to communicate. The displayed information may include an identifier for the user (e.g., their first name), a topic about which they are calling, their position in the queue, an estimated wait time, actual wait times of other users, average call time for other callers, profile information about the user (e.g., user's age, location, products owned, etc.), or some other type of information that may be relevant to whether user 122 would like to communicate with the user. In some cases, two or more users may already be connected over a communication channel and wait treatment system 101 may provide information about the individual users and/or information about the channel in the aggregate (e.g., display that the channel is currently discussing a particular topic). User 122 may then decide whether to join that already established channel (e.g., over some other already established channel or not at all).

In some examples, wait treatment system 101 provides a platform in which users can barter for queue positions. For example, if user 122 determines that user 123 has a much shorter wait time that they do, user 122 may make an offer to user 123 over the communication channel for user 123's position in the queue. The consideration provided for the offer may be money, credits (e.g., for use with a company associated with the queue), or some other form of compensation that wait treatment system 101 can facilitate the exchange of. If user 123 accepts that offer, the communication session request from endpoint 102 is moved into the position of the queue that was held by the communication session request from endpoint 103. In examples where another system manages the queue, wait treatment system 101 communicates with that system (e.g., using the APIs mentioned above) to instruct the movement of requests in the queue. User 123's session request may then be moved back into the queue position previously held by user 122's request or may be moved to the back of the queue. As noted above, wait treatment system 101 may present the position, estimated wait time, etc. for other users in the queue. That information may be relevant to user 122's determination about whether to make an offer to a user for their queue position and how much that queue position may be worth for calculating the offer. In some examples, wait treatment system 101 itself may offer to bump users back in the queue (e.g., offer money, discounts, or other consideration). Offers from wait treatment system 101 may be done to move other users up in the queue to keep them happy while the users that accept the offers are also happy for being compensated.

Advantageously, by enabling user 122 and user 123 to communicate with each other (and potentially other users) while their session requests are waiting in a queue, user 122 and user 123 are more likely to have a productive waiting experience. When user 122's communication request reaches the front of the queue, endpoint 102 may be pulled from the communication channel automatically to establish the requested communication session with endpoint 104. Alternatively, wait treatment system 101 may notify user 122 that they are reaching the front of the queue and provide them with the option to stay on the communication channel. If user 122 wishes to stay on the communication channel (e.g., to finish a conversation with user 123 or another user), then wait treatment system 101 keeps endpoint 102 on the communication channel and moves the session request from endpoint 102 back in the queue. If wait treatment system 101 does not manage the queue itself, then wait treatment system 101 instructs the system that does on the movement. In some examples, endpoint 102's request is kept as next up in the front of the queue until user 122 is ready or the request may be moved further back in the queue.

Figure 3:
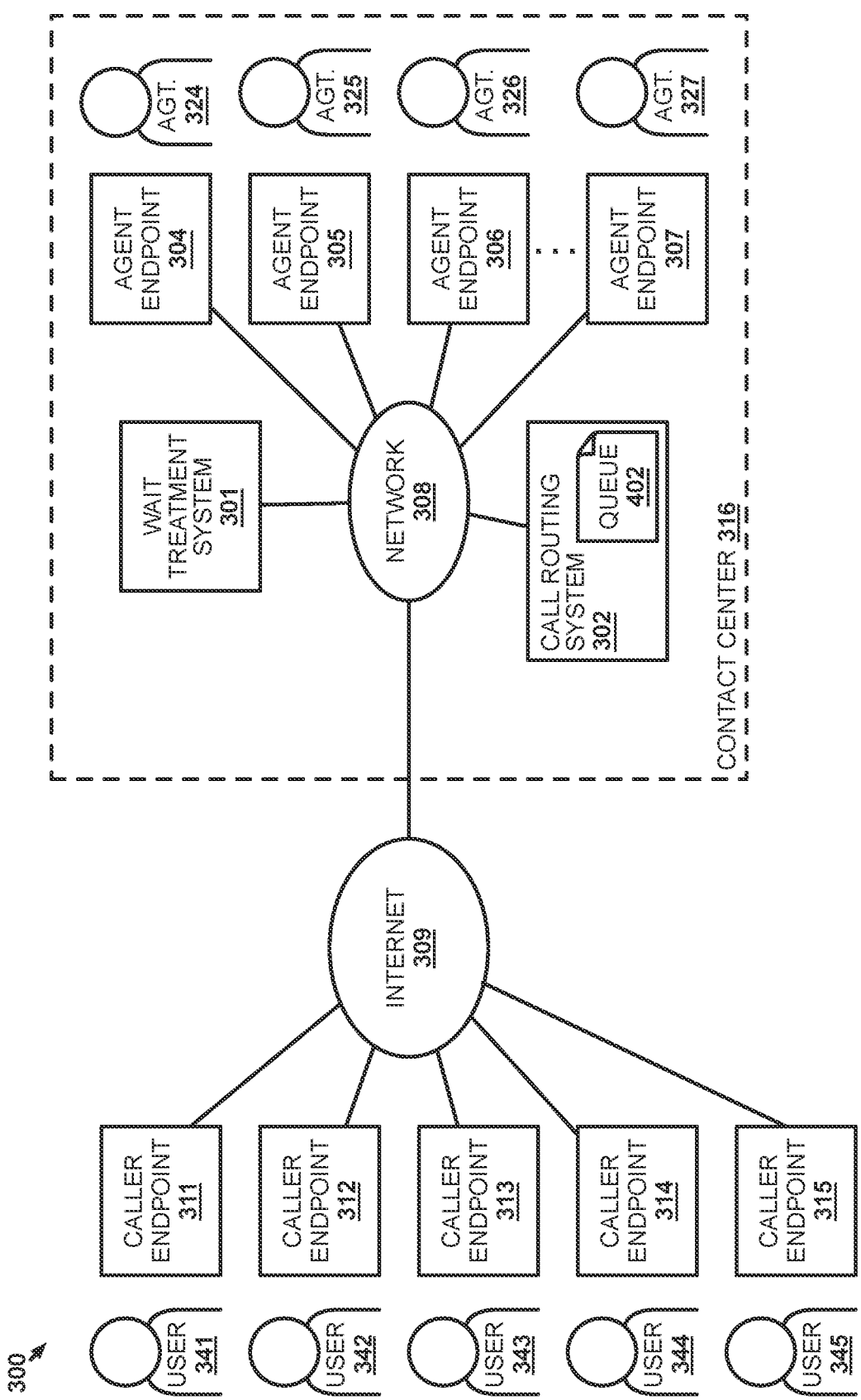
FIG. 3 illustrates an implementation for connecting endpoints of users waiting in a queue.

FIG. 3 illustrates implementation 300 for connecting endpoints of users waiting in a queue. Implementation 300 includes wait treatment system 301, call routing system 302, agent endpoints 304-307, contact center network 308, caller endpoints 311-315, and Internet 309. Although, wait treatment system 301, call routing system 302, agent endpoints 304-307, and contact center network 308 are part of contact center 316, no element of contact center 316 need be co-located with another. As such, contact center network 308 may use Internet 309, and possibly other local area networks, to exchange communications. While only four agent endpoints are shown in implementation 300, contact center 316 may include any number of agent endpoints.

In this example, agent endpoints 304-307 are operated by respective agents 324-327 as agents of contact center 316 and caller endpoints 311-315 are operated by users 341-345 who are callers to contact center 316. In this example, the communication session requests described above are voice calls. Though all of caller endpoints 311-315 connect over Internet 309, it should be understood that the calls may be traditional telephone calls and/or voice calls initiated over an internet specific mechanism (e.g., through a website associated with the contact center or a telephony client application). Call routing system 302 receives the calls (i.e., session requests) directed towards contact center 316 and determines to which of agent endpoints 304-307 each call should be routed. In some examples, call routing system 302 may be an Automatic Call Distributor (ACD). If an agent system is not currently available to handle a call (or at least an agent system acceptable to call routing system 302 is not available), then call routing system 302 places the call in a queue. When the call reaches the front of the queue, call routing system 302 routes the call to a selected agent system when the agent system becomes available. The agent and the caller can then speak over the call established between their two endpoints. While calls are queued by call routing system 302, wait treatment system 301 facilitates communications channel(s) between caller endpoints 311-315 so that two or more of users 341-342 can communicate with one another. In some examples, an agent, such as one of agents 324-327, may be seeded into a chat channel to provide their expertise.

Figure 4:
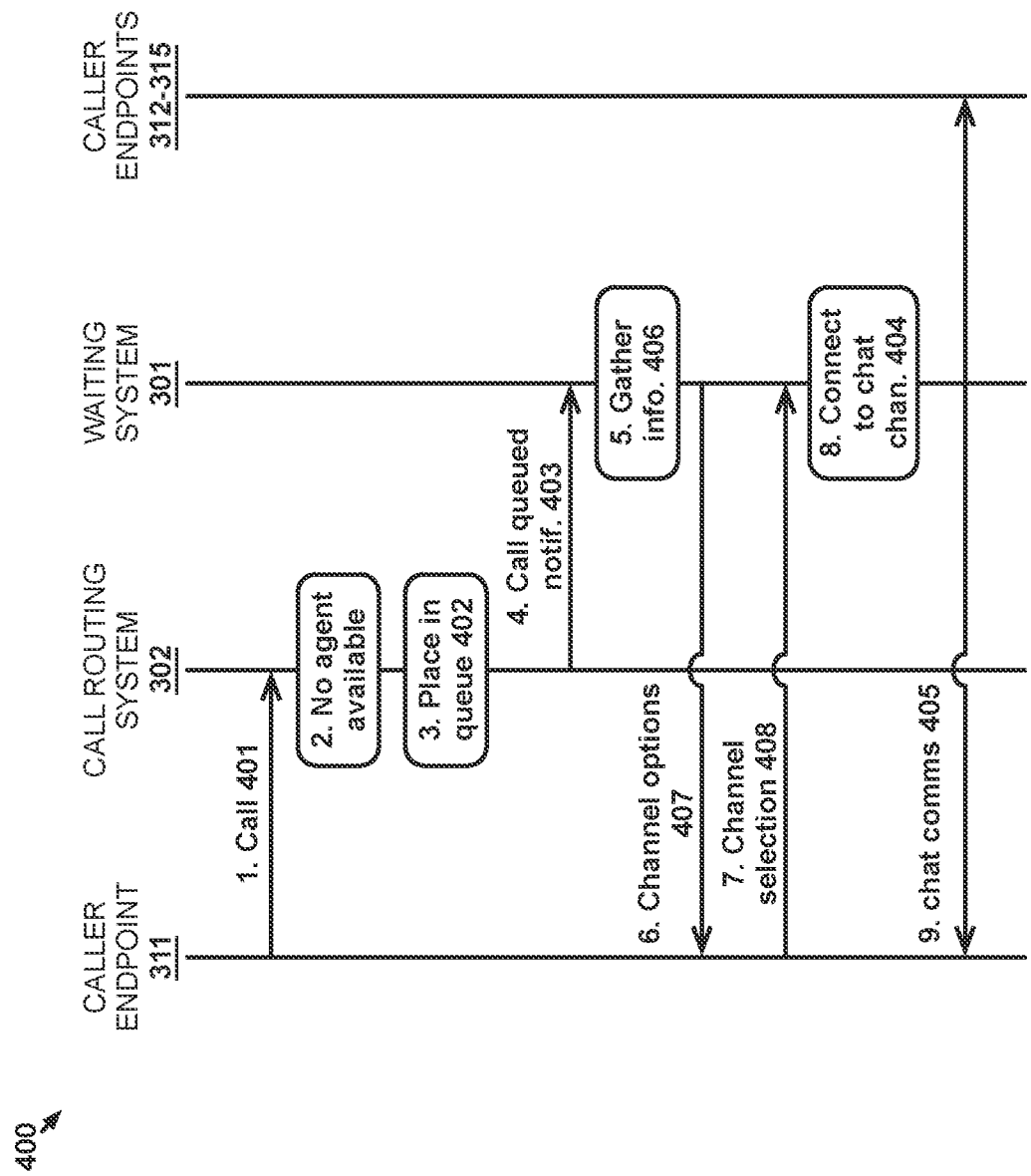
FIG. 4 illustrates an operational scenario for connecting endpoints of users waiting in a queue.

FIG. 4 illustrates operational scenario 400 for connecting endpoints of users waiting in a queue. In operational scenario 400, at step 1, user 341 instructs caller endpoint 311 to initiate call 401 to contact center 316, which is received by call routing system 302. User 341 may dial, or otherwise indicate, a telephone number into caller endpoint 311, may select a link in a webpage that initiates a web-based call (e.g., WebRTC) through a browser application displaying the webpage or through a communication client application that executes on caller endpoint 311, or user 341 may indicate their instruction to call contact center 316 in some other manner. Upon receiving call 401, which until it is terminated with one of agent endpoints 304-307 is considered a session request, call routing system 302 determines at step 2 that none of agents 324-327 are currently available to accept call 401. Accordingly, call routing system 302 places call 401 in queue 402 at step 3. In this example, calls from caller endpoints 312-315 are also queued in queue 402. Call routing system 302 may maintain one or more queues in addition to queue 402 and calls from other caller endpoints may be queued therein. Upon receiving call 401, call routing system 302 may determine that call 401 should be placed in queue 402 over the other queues based on information gathered from user 341 (e.g., using an interactive voice response system, keypad entries, or other input mechanism) or based on some other type of information associated with call 401. In some examples, any call directed to contact center 316 can be handled by any of agents 324-327. In other examples, agents 324-327 may only handle calls for queue 402 while other agents handle calls in other queues. In some cases, call routing system 302 may select a particular agent to handle a call out of queue 402 based on information associated with the call (e.g., a call topic, a caller priority, a level of expertise, caller profile, caller history, etc.).

Upon call 401 being placed in queue 402, call routing system 302 sends call queued notification 403 at step 4 to wait treatment system 301. Call queued notification 403 may be automatically pushed to wait treatment system 301 or wait treatment system 301 may poll call routing system 302 for information (i.e., call queued notification 403) about calls being placed in queue 402 (or other queues maintained by call routing system 302). Upon receiving call queued notification 403, wait treatment system 301 gathers information 406 at step 5 that will be used to identify channels that may be of interest, or otherwise pertinent, to user 341. Information 406 is information about call 401/user 341, communication channels already established, other calls in queue 402, the users of the other calls, calls already completed (e.g., actual wait times/call times of those calls), or some other type of information relevant to selecting/creating a communication channel. Information 406 may include user identifiers for users in queue 402, topics about which users are calling, user call positions in queue 402, estimated wait times, average call time for other callers, profile information about users (e.g., user's age, location, products owned, past activities associated with wait treatment system 301, such as past bartering outcomes and the circumstances (e.g., queue position differentials, amounts offered, etc.) surrounding those outcomes, etc.), current topics being discussed over a channel, or some other type of information that may be relevant to identifying existing chat channels, or identifying users for a new chat channel, over which user 341 can communicate. In some examples, wait treatment system 301 may gather all of information 406 at this point or wait treatment system 301 may already have at least a portion of information 406 (e.g., by virtue of having to gather information 406 for other calls placed in queue 402 previously). Information 406 may be gathered from call routing system 302 (e.g., using an API), an IVR system, a user profile repository, wait treatment system 301, or some other system—including combinations thereof. Using information 406, wait treatment system 301 determines channel options 407. Wait treatment system 301 may use an artificial intelligence model on information 406 to identify one or more channels/users with which user 341 may want to communicate. In other examples, explicitly define logic may determine channel options 407 from information 406. For example, logic may indicate that for a channel to be included in channel options 407 the users already thereon must have conversed about the topic for which user 341 is calling. While this example only speaks to recommending channels for communication, other examples may recommend actions instead of, or in addition to, those channels. For instance, wait treatment system 301 may recommend one or more users with which user 341 may want to barter for a higher queue position (e.g., may indicate that user 344 is likely to accept an offer and may provide a recommended offer). In another example, wait treatment system 301 may provide an example question that user 341 could ask on a chat channel. Similarly, some recommended actions (or actions taken by user 341's own volition) may not require a communication channel between users. For example, a mechanism used by wait treatment system 301 to enable bartering for queue positions may not open a communication channel between users. Rather, some other type of messaging may be exchanged between the involved systems.

Once channel options 407 have been determined, wait treatment system 301 sends channel options 407 in a message to caller endpoint 411 at step 6 and caller endpoint 411 presents channel options 407 to user 341. A client application on caller endpoint 311 may present channel options 407 to user 341 and allow user 341 to select one of channel options 407. In some examples, channel options 407 may be sent to caller endpoint 311 in an email or other type of message and links within the email may direct to the respective ones of channel options 407. Other manners of presenting channel options 407 to user 341 may also be used. Channel options 407 may further provide portions of information 406 relevant to each channel option (e.g., topic of discussion, profiles of users therein, etc.) so that user 341 can be better informed about which to select. In this example, user 341 selects chat channel 404 from channel options 407 and caller endpoint 311 notifies wait treatment system 301 of the select at step 7. For instance, caller endpoint 311 may select chat channel 404 from channel options 407 presented by a client application on caller endpoint 311, may select a link for chat channel 404 from an email, or select chat channel 404 in some other manner depending on how channel options 407 were presented.

While user 341 selects chat channel 404 from channel options 407 in this example, in other examples wait treatment system 301 may automatically identify or create chat channel 404 based on information 406. User 341 may be forced to use chat channel 404 should they want to chat or may then be allowed to switch channels or create a new channel. In some examples, when presented with channel options 407, user 341 may elect to not join a chat channel at all and simply wait for an agent without conversing with other users. Similarly, in some examples, wait treatment system 301 may determine that a chat channel would not be beneficial for user 341 based on information 406 and not present user 341 with the option to join one. For instance, information 406 may indicate that call 401 is likely to be connected to an agent relatively quickly (e.g., within a threshold amount of time, such as 2 minutes) and may, therefore, determine that there will not be enough time for a channel to be beneficial to user 341.

Wait treatment system 301 then connects caller endpoint 311 to chat channel 404 at step 8. Since chat channel 404 uses a different mode of communication than call 401 (i.e., text for chat channel 404 and voice for call 401), caller endpoint 311 need be capable of exchanging communications over chat channel 404. In some examples, a client application or web-based communication application (e.g., a communication interface presented in a webpage) is capable of supporting both call 401 and chat channel 404 on caller endpoint 311. In other examples, another application or webpage may be opened to handle chat channel 404. For instance, while call 401 is in queue 402, wait treatment system 301 may text message (e.g., using short message service (SMS)), email, or otherwise send a link to caller endpoint 311 inviting user 341 to join chat channel 404. User 341 selecting that link may open an application or webpage on caller endpoint 311 that connects to chat channel 404. In further examples, a second user system of user 341 may be employed to handle chat channel 404. For instance, caller endpoint 311 may be a standard telephone that is used to place call 401 and chat channel 404 may be connected to a laptop of user 341 (e.g., user 341 may receive an email with a link to connect to chat channel 404 on the laptop, although, caller endpoint 311 could also receive the email if so capable). Other manners of connecting caller endpoint 311 to chat channel 404 may also be used.

Once connected, chat communications 405 are exchanged at step 9 between caller endpoint 311 and caller endpoints 312-315. In this example, anything typed by one of users 341-345 into their respective caller endpoints 311-315 is seen by the others. In some examples, caller endpoint 311 may be allowed to select a particular one of users 342-345 to communicate with directly. Chat channel 404 may support other media beyond text-based messages (e.g., users may send photos or video messages in chat communications 405). Chat communications 405, therefore, allow users 341-345 to communicate with one another in real-time while they are waiting for their queued calls to be handled by one of agents 324-327. In some examples, user 341 may be able to join multiple chat channels, including breaking channel members off into a new channel with a subset of chat channel 404's members (e.g., for a one-on-one conversation).

Figure 5:
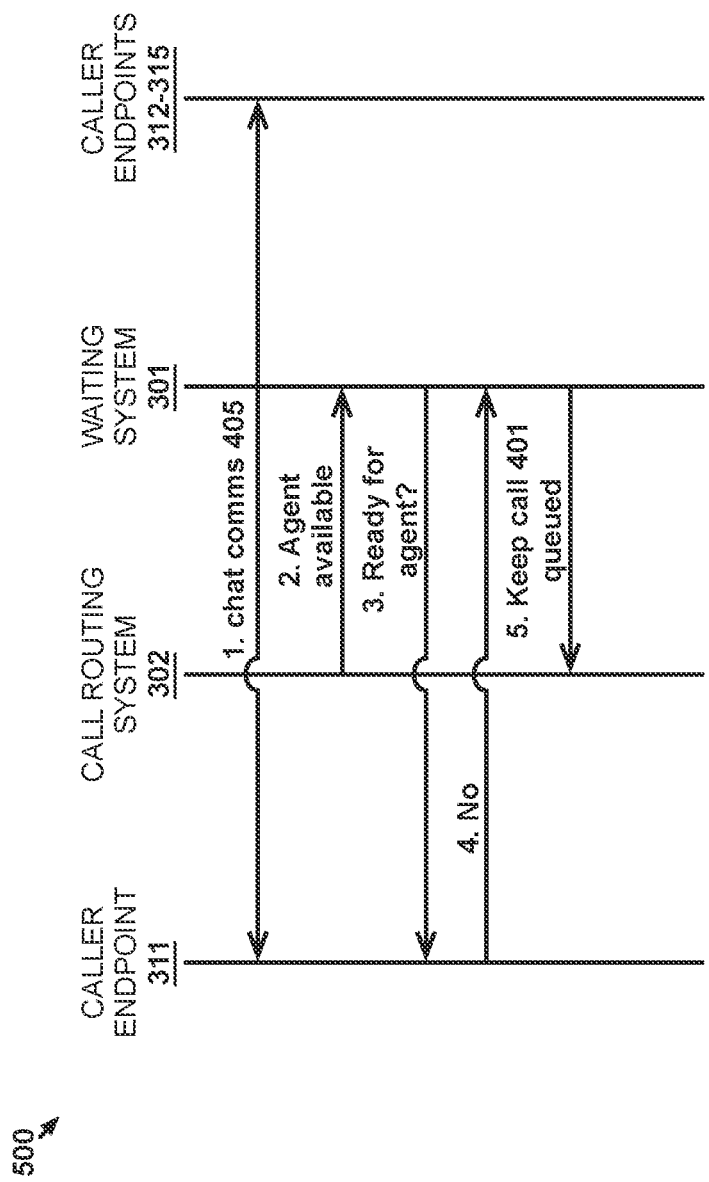
FIG. 5 illustrates an operational scenario for connecting endpoints of users waiting in a queue.

FIG. 5 illustrates operational scenario 500 for connecting endpoints of users waiting in a queue. In some examples, when call 401 reaches the front of queue 402, call routing system 302 may connect call 401 to the agent endpoint of the next available agent. In those examples, caller endpoint 311 may be disconnected from chat channel 404. Operational scenario 500 provides a mechanism in which user 341 can request to stay on chat channel 404 rather than being connected to an agent. In operational scenario 500, chat communications 405 are being exchanged on chat channel 404 between caller endpoint 311 and caller endpoints 312-315 at step 1 like they were in step 7 above. While caller endpoint 311 is on chat channel 404, call routing system 302 notifies wait treatment system 301 at step 2 that an agent is available to handle call 401. Call routing system 302 may push the notification to wait treatment system 301, like it did with call queued notification 403, wait treatment system 301 may poll call routing system 302 for which call is next in queue 402 for connection to an agent, or wait treatment system 301 may be notified that call 401 is next up for connection in some other manner.

In response to being notified that an agent is available, wait treatment system 301 queries user 341 at step 3 about whether they would like to remain on chat channel 404 or have call 401 connected to an agent. User 341 may be queried by wait treatment system 301 sending a message to caller endpoint 311 that causes caller endpoint 311 to display a message and an option for user 341 to indicate their desire. In this example, user 341 indicates through caller endpoint 311 (e.g., by selecting a displayed option) at step 4 that they do not want to be connected to an agent at the moment. Caller endpoint 311 may transfer a message to wait treatment system 301 indicating user 341's selection. The above-messages may be sent over a control channel of chat channel 404 or may be sent in some other manner. Wait treatment system 301 then sends a message to call routing system 302 at step 5 instructing call routing system 302 to keep call 401 in queue 402. In response to the instruction, call routing system 302 may keep call 401 as next up until it receives an indication that user 341 is ready for connection or may move call 401 down in queue 402. Had user 341 indicated that they are ready for call 401 to be connected to an agent, then call routing system 302 would connect call 401 to an available agent. In some examples, other members on chat channel 404 (and any other chat channel user 341 may be involved in) are notified that user 341 has left the channel.

In some examples, once call 401 has been connected to an available agent, a display interface into chat channel 404 presented by caller endpoint 311 may be taken down with user 341 being removed from chat channel 404. In other examples, the display interface may remain. The display interface may require user input explicitly leaving chat channel 404 before it is removed, the display interface may provide user 341 with the option to remain on chat channel 404 even after being connected to an agent, or the interface into chat channel 404 may remain open for some other reason. An advantage of leaving the interface open may be so that user 341 can relay an answer provided by an agent to the other users on chat channel 404.

Figure 6:
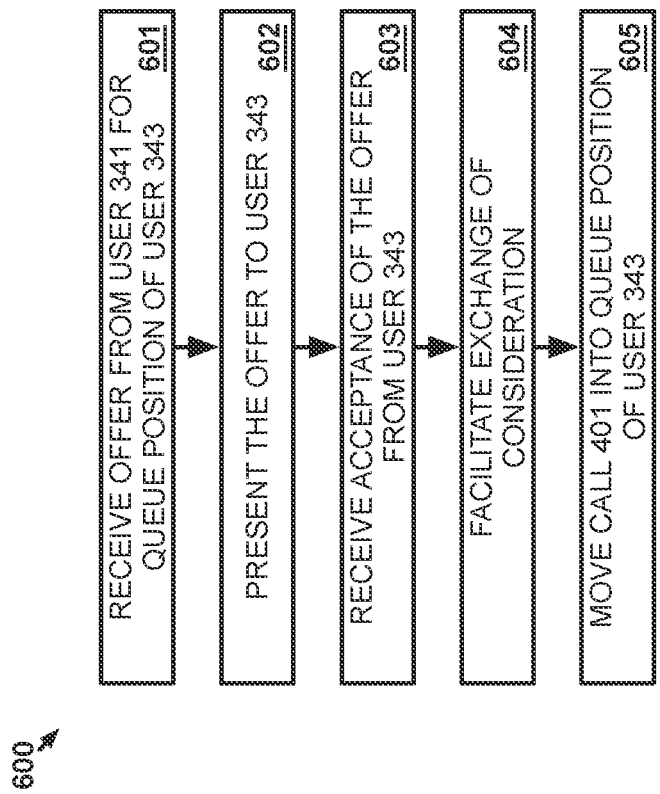
FIG. 6 illustrates an operation to connect endpoints of users waiting in a queue.

FIG. 6 illustrates operation 600 to connect endpoints of users waiting in a queue. In operation 600, while caller endpoint 311 is connected to chat channel 404, wait treatment system 301 provides an interface on caller endpoint 311 through which user 341 can make offers to another user on chat channel 404 (or, in some examples, to users with calls in queue 402 but who are not in chat channel 404) to move call 401 into their queue position. In operation 600, wait treatment system 301 receives an offer from user 341 to move call 401 into the queue position of user 343's call (601). For example, user 341 may type a particular amount of money into an interface presented by caller endpoint 311, the interface may provide predefined suggested amounts, or user 341 may indicate an offer in some other manner. In some examples, wait treatment system 301 may provide user 343 with the option to advertise an offer defining what they are willing to accept for their queue position. In further examples, rather than proposing an offer to a specific user (i.e., user 343 in this case), user 341 may have the option to offer to multiple users that are ahead of them in queue 402. Sending offers to multiple users increases user 341's chances of moving up in queue 402. User 341 may be able to define a minimum number of positions ahead of them that another user must be to receive user 341's offer (i.e., it may not be worth it to move up fewer than 10 spots in queue 402). Similarly, user 341 may be able to define position ranges that receive different offers (e.g., users having positions further up in queue 402 will receive higher offers from user 341). Wait treatment system 301 presents the offer to user 343 (602). For example, wait treatment system 301 may trigger a popup on caller endpoint 313 that notifies user 343 of the offer and provides user 343 with options to act on the offer. In this example, wait treatment system 301 receives notice that user 343 has accepted the offer (603). In response to user 343's acceptance, wait treatment system 301 facilitates the exchange of consideration (e.g., money) between user 341 and user 343 (604). For example, wait treatment system 301 may access a payment service used by user 341 and user 343 to transfer money from user 341's account to user 343's account. Wait treatment system 301 also instructed call routing system 302 to move call 401 into the position of user 343's call in queue 402 (605). Wait treatment system 301 may also instruct call routing system 302 on where user 343's call should be moved in queue 402 or call routing system 302 may handle that call's movement automatically. For example, user 343's call may be moved to the back of queue 402 or to the position vacated by call 401.

Figure 7:
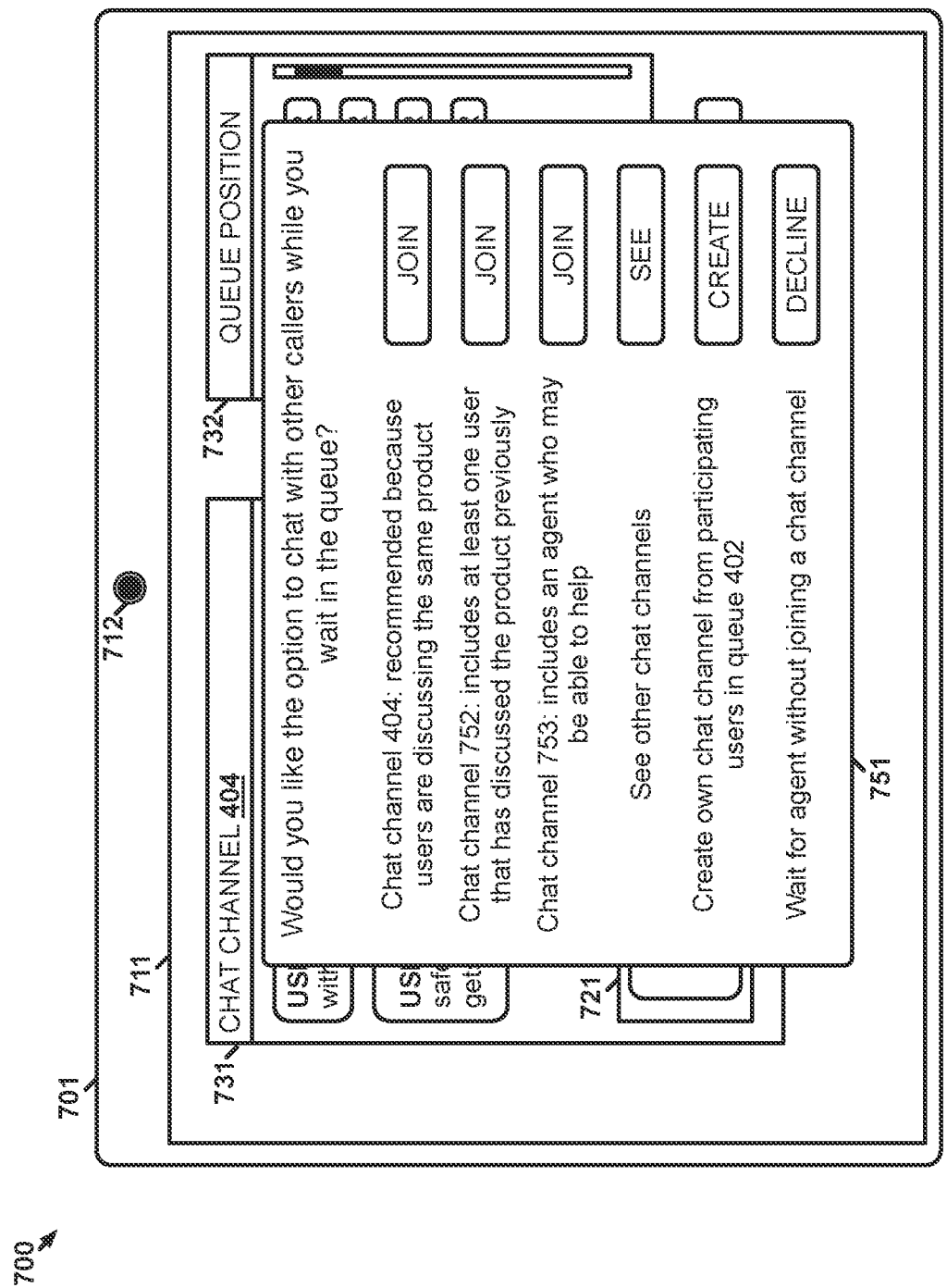
FIG. 7 illustrates a display system for connecting endpoints of users waiting in a queue.

FIG. 7 illustrates display system 700 for connecting endpoints of users waiting in a queue. Display system 700 includes display housing 701, which houses display 711 and camera 712. Display 711 may be a cathode ray tube (CRT), Liquid Crystal Display (LCD), Light Emitting Diode display (LED), or some other type of display capable of presenting images described below. Camera 712 includes optics and an image sensor for capturing video of a participant viewing display 711. Camera 712 may be omitted in some examples. Display system 700, in this example, is a display system of caller endpoint 311, although a display system of caller endpoint 311 may use alternative configurations.

Display 711, in this example, is currently displaying a message with user selectable options before caller endpoint 311 is connected to chat channel 404. The message is displayed in waiting channel popup 751. Waiting channel popup 751 presents three chat channel options, chat channels 404, 752, and 753, and presents a button associated with each option that, when selected by user 341, will join the selected chat channel. In this example, wait treatment system 301 has identified chat channel 404 as a recommended chat channel for user 341 and presents reason(s) for recommending that particular channel (i.e., information about the channel). Likewise, chat channels 752 and 753 are presented along with reasons for providing those channels as well. Should user 341 determine that none of the channel options interest them, then wait treatment system 301, through waiting channel popup 751, also provides user 341 with an option to see other chat channels that are available. Upon selecting the see button, waiting channel popup 751, or another window, may display additional chat channels available to user 341 along with information about those channels (e.g., a topic being discussed, information about users therein, etc.). Alternatively, user 341 is provided with an option to create their own channel of users in queue 402 (at least those that have assented to doing so). If user 341 selects the create button, then user 341 may be presented with a list of users and information about those users (e.g., user profile information, queue position information, etc.) that user 341 can select for joining to a chat channel. Should user 341 not want to join a chat channel altogether, waiting channel popup 751 also provides them with the option to decline the offer to join.

In this example, a graphical interface to chat channel 404 is already displayed behind waiting channel popup 751 to give user 341 a preview of what to expect. However, other examples may refrain from such a display prior to user 341 assenting to join chat channel 404. Other examples may query user 341 in some other manner. In some cases, instead of (or in addition to) the preview shown by display 711, display 711 may present a window indicating user positions in queue 402 as a whole. User 341 may then determine how far back in queue 402 they are currently positioned and may view information (if such information is available and presented) about users with which user 341 may be willing to barter. Such a window may also provide user 341 with information about the users in queue 402 to help user 341 determine who they may want to invite to chat should they select the option to create their own chat channel. In some examples, the window indicating user positions in queue 402 may be displayed instead of suggestions like those in waiting channel popup 751. This gives user 341 free reign to create their own chat channels. Suggested channels may be provided in addition to the individual users. Other manners of initiating user 341's experience into the channels provided by wait treatment system 301 may also be used.

Figure 8:
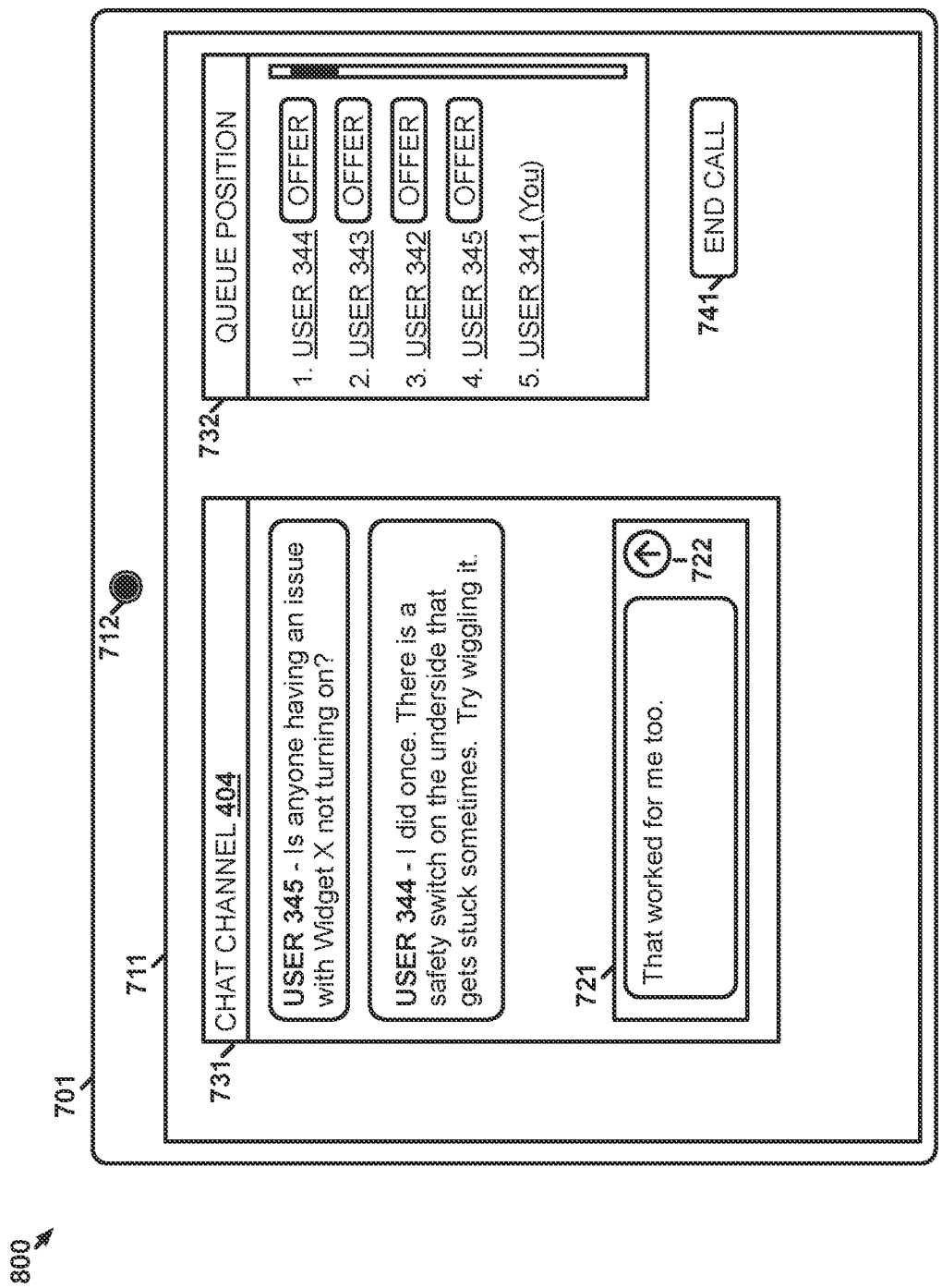
FIG. 8 illustrates a display system for connecting endpoints of users waiting in a queue.

FIG. 8 illustrates display system 800 for connecting endpoints of users waiting in a queue. Display system 800 is an example of display system 700 after user 341 has selected to join chat channel 404 from waiting channel popup 751. Display 711 displays chat channel window 731, queue position window 732, and end call button 741. The aforementioned display elements may be presented by a communication client application, by a web browser, or by some other type of application capable of facilitating communication sessions on caller endpoint 311. In this example, the application handles both communications for chat channel 404 and call 401, as evidenced by end call button 741, which disconnects caller endpoint 311 from call 401 when selected by user 341. For example, user 341 may be growing a website of a company and may decide that they want to speak with an agent. User 341 may initiate call 401 via a link provided in the website (e.g., a button with the text "Talk to an agent now"). The website then displays elements 731, 732, and 741 after call 401 is initiated. In other examples, communications for chat channel 404 and call 401 may be handled by separate applications.

Queue position window 732 shows the users who are currently on chat channel 404 and the position of each user in queue 402. Since user 341 just joined, they are shown in the last position relative to the other users. Each user in this example is represented by their identifier from implementation 300. In practice, each user may be identified as a name, a username, their position in the queue, or some other type of identifier. Next to each user in queue position window 732 is a button that, when selected, enables user 341 to make an offer for that user's position in queue 402. In other examples, additional or different information may also be displayed, such as each user's estimated wait time, a topic about which the user is calling, a score for how helpful the user has been in the past, a position relative to the entire queue (e.g., in cases when users 341-345 are not the entirety of queue 402), or any other type of information that may be useful to user 341 when communicating on chat channel 404. In some examples, rather than information always being displayed, user 341 may be able to trigger the display of additional information pertinent to a user (e.g., hovering over user 345 in queue position window 732 may trigger display of a popup window that provides information about user 345). In some examples, user 341 may be able to select users in queue position window 732 to break off into a separate group for discussion. Similarly, in some examples, queue position window 732, or another window, may provide user with other chat channels, and information about those chat channels, that they may wish to join instead of chat channel 404 upon selection thereof. It should be further understood, that the windows displayed by display 711, and the information displayed therein, may change/update as events occur. For example, users in queue position window 732 may be added and removed (i.e., as users join queue 402 or drop from queue 402) and chat channel window 731 may change depending on the chat channel being used.

Chat channel window 731 includes text input area 721 and post button 722. Chat channel window 731 is already showing messages from user 345 and user 344. Text input area 721 is an interface element into which user 341 can type a message that they want to submit to chat channel 404. User 341 has typed just such a message in this example and, upon user 341 selecting post button 722, the message will be posted to chat channel 404, as can be seen in display system 900. User 341 can, therefore, participate in a chat conversation in real time with other users on chat channel 404. In some examples, chat channel 404 may support speech to text transcription, which allows user 341 to speak and have their word transcribed into chat channel 404, rather than requiring user 341 to type. In some examples, chat channel 404 may support other media types for transmission. For instance, user 341 may take a picture using camera 712, or select a photo from a photo library, for transmission over chat channel 404. In some examples, should user 341 want to chat with one of users 342-345 one on one (or want to talk with more than one, but not all, of users 342-345), then user 341 may be able to select the desired user from queue position window 732 and open a new chat channel window (or replace chat channel window 731) to communicate with that user. Also, while this example places user 341 into chat channel 404 as a single option, some examples may provide multiple chat channel options to user 341. For example, a window similar to queue position window 732 may display a list of different chat channels with information descriptive of those chat channels (e.g., topics being discussed, activity levels, etc.) and user 341 may select chat channel 404 as their desired chat channel from that list.

In some examples, another window, or a button to open that other window, may be displayed that provides information about other chat channels available to user 341. For instance, the window may provide other channel options with information about those channels to help user 341 decide on a channel (e.g., similarly to how waiting channel popup 751 displayed channel options). Should user 341 decide to join/create another chat channel, wait treatment system 301 may remove user 341 from chat channel 404 or user 341 may be allowed to stay on multiple channels. Similarly, user 341 may be provided with a selectable option (e.g., a button like end call button 741) that removes user 341 from all chat channels while waiting.

Figure 9:
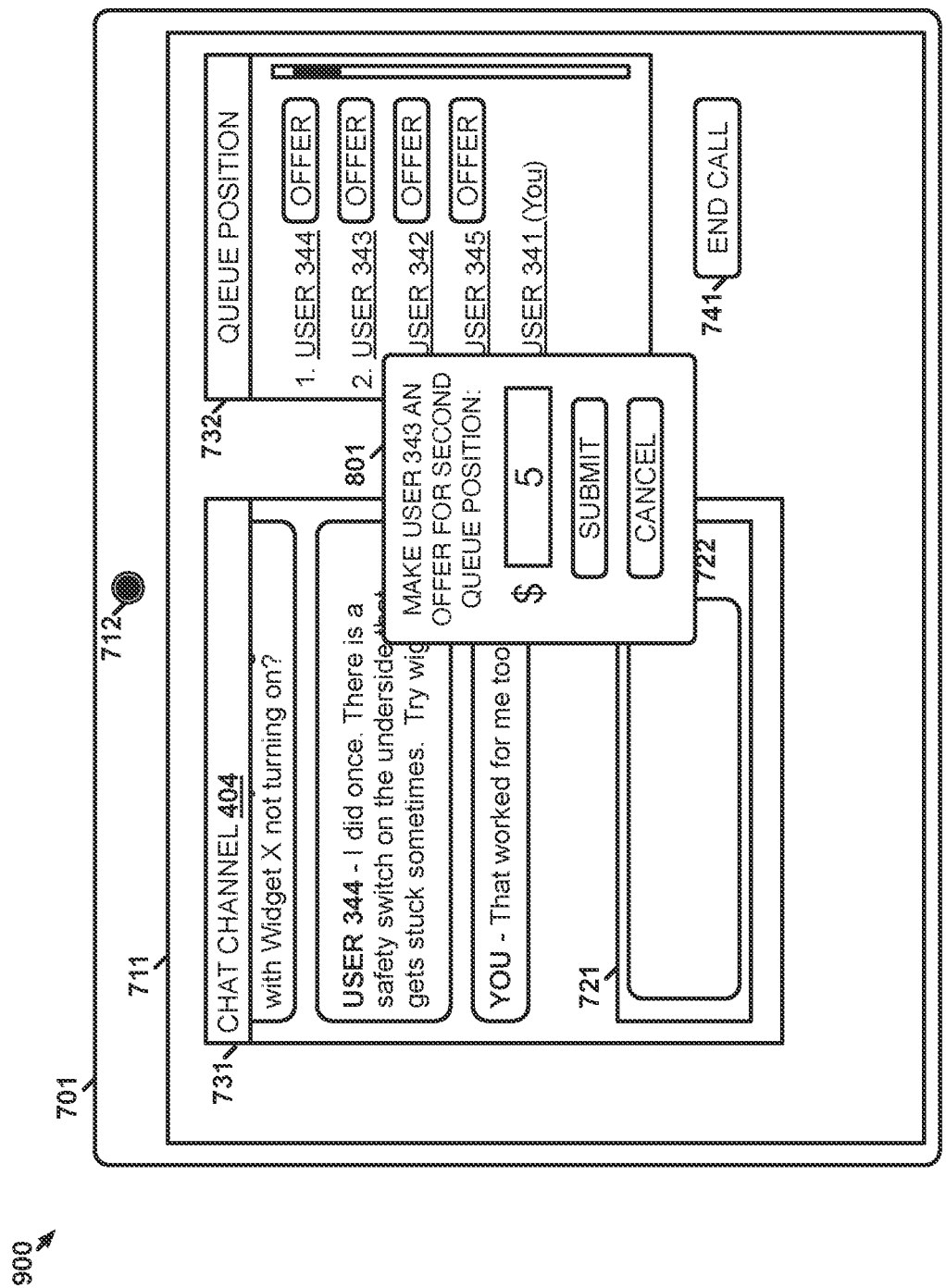
FIG. 9 illustrates a display system for connecting endpoints of users waiting in a queue.

FIG. 9 illustrates display system 900 for connecting endpoints of users waiting in a queue. Display system 900 is an example of display system 800 after user 341 selects the "Offer" button next to user 343's listing in queue position window 732. In particular, display 711 displays offer window 801, which provides user 341 with a data entry field where user 341 can input an offer to user 343 for user 343's position in queue 402. In this example, user 341 has entered $5. User 341 can select "Submit" to present the offer to user 343 or can select "Cancel" to close out of offer window 801 without making an offer.

Figure 10:
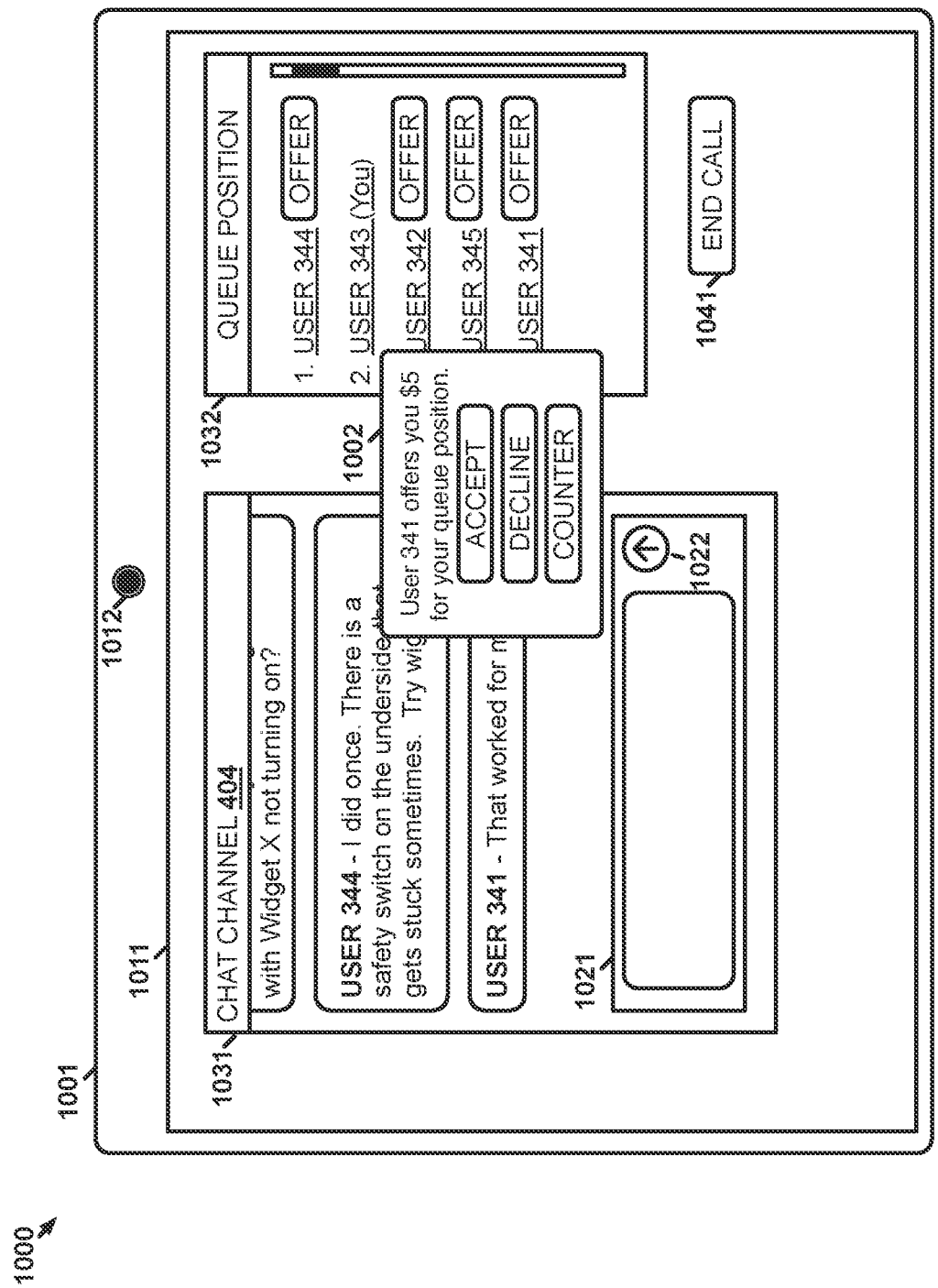
FIG. 10 illustrates a display system for connecting endpoints of users waiting in a queue.

FIG. 10 illustrates display system 1000 for connecting endpoints of users waiting in a queue. Display system 1000 is similar to display system 700 and includes display housing 1001, which houses display 1011 and camera 1012. Camera 1012 may be omitted in some examples. Display system 1000, in this example, is a display system of caller endpoint 313, although a display system of caller endpoint 313 may use alternative configurations. In this example, similar to display system 800 above, display 1011 is displaying chat channel window 1031, queue position window 1032, and end call button 1041. Chat channel window 1031 displays messages of users on chat channel 404 and allows user 343 to post to chat channel 404 using text input area 1021 and post button 1022.

Display 1011 is also displaying offer acceptance window 1002. Offer acceptance window 1002 is displayed after caller endpoint 313 receiving notification from wait treatment system 301 that user 341 has submitting the $5 offer discussed above. In other examples, the offer may be presented in chat channel 404 or may be presented in some other manner. Offer acceptance window 1002 gives user 343 the option of accepting the offer, declining the offer, or countering the offer.

Figure 11:
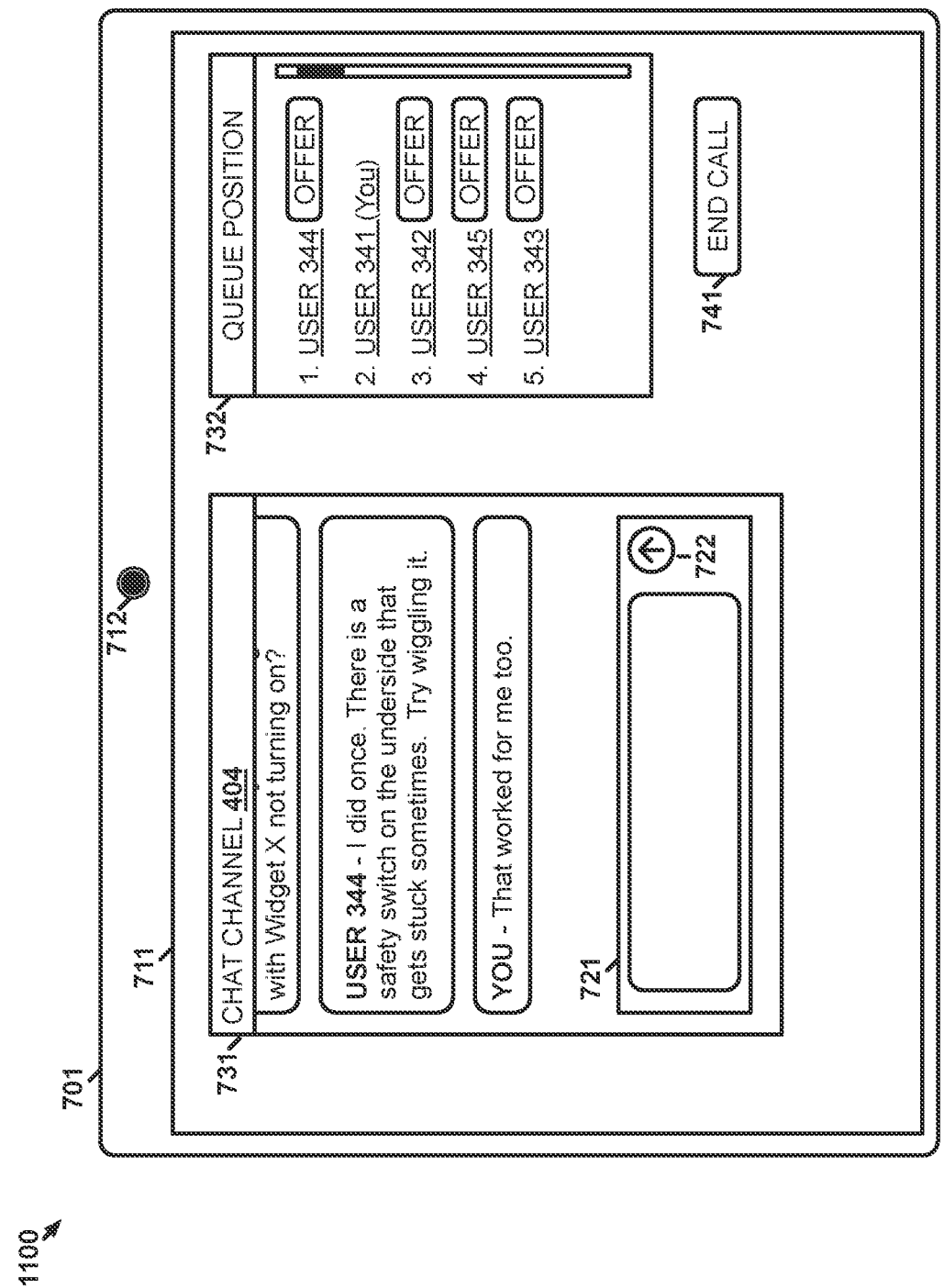
FIG. 11 illustrates a display system for connecting endpoints of users waiting in a queue.

FIG. 11 illustrates display system 1100 for connecting endpoints of users waiting in a queue. Display system 1100 is an example of display system 900 (i.e., the display system for user 341) after user 343 opts to accept user 341's offer. As such, queue position window 732 now shows user 341 in second position within queue 402, which was previously held by user 343. User 343 is now in fifth position, which was previously held by user 341. The displayed positions reflect the positions of each user's call as they now stand in queue 402 as facilitated by wait treatment system 301 and call routing system 302 in response to user 343 accepting the offer. Should user 343 have declined the offer, display 711 may have displayed a window, or other type of alert, indicating that fact. Similarly, had user 343 decided to present a counter offer, display 711 may have presented a window similar to offer acceptance window 1002 that allows user 341 to accept, decline, or counter that counter offer.

Figure 12:
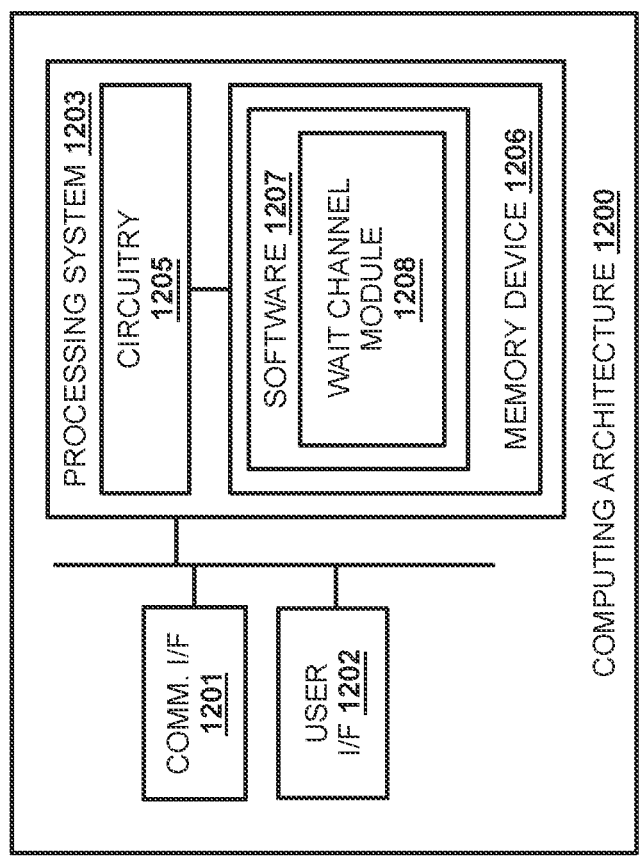
FIG. 12 illustrates a computing architecture for connecting endpoints of users waiting in a queue.

FIG. 12 illustrates computing architecture 1200 for connecting endpoints of users waiting in a queue. Computing architecture 1200 is an example computing architecture for wait treatment systems 101 and 301, although systems 101 and 301 may use alternative configurations. Computing architecture 1200 may also be used for other computing systems described herein, such as the described endpoints. Computing architecture 1200 comprises communication interface 1201, user interface 1202, and processing system 1203. Processing system 1203 is linked to communication interface 1201 and user interface 1202. Processing system 1203 includes processing circuitry 1205 and memory device 1206 that stores operating software 1207.

Communication interface 1201 comprises components that communicate over communication links, such as network cards, ports, RF transceivers, processing circuitry and software, or some other communication devices. Communication interface 1201 may be configured to communicate over metallic, wireless, or optical links. Communication interface 1201 may be configured to use TDM, IP, Ethernet, optical networking, wireless protocols, communication signaling, or some other communication format—including combinations thereof.

User interface 1202 comprises components that interact with a user. User interface 1202 may include a keyboard, display screen, mouse, touch pad, or some other user input/output apparatus. User interface 1202 may be omitted in some examples.

Processing circuitry 1205 comprises microprocessor and other circuitry that retrieves and executes operating software 1207 from memory device 1206. Memory device 1206 comprises a computer readable storage medium, such as a disk drive, flash drive, data storage circuitry, or some other memory apparatus. In no examples would a storage medium of memory device 1206, or any other computer readable storage medium herein, be considered a propagated signal. Operating software 1207 comprises computer programs, firmware, or some other form of machine-readable processing instructions. Operating software 1207 includes wait channel module 1208. Operating software 1207 may further include an operating system, utilities, drivers, network interfaces, applications, or some other type of software. When executed by processing circuitry 1205, operating software 1207 directs processing system 1203 to operate computing architecture 1200 as described herein.

In particular, wait channel module 1208 directs processing system 1203 to determine that a first communication session request from a first endpoint is in a queue for establishing a communication session with a receiving endpoint to which the queue is regulating access. While the first communication session request is in the queue, wait channel module 1208 directs processing system 1203 to connect the first endpoint to a communication channel between the first endpoint and a second endpoint having a second communication session request in the queue. Wait channel module 1208 also directs processing system 1203 to exchange user communications between the first endpoint and the second endpoint over the communication channel.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   determining that a first communication session request from a first endpoint is in a queue for establishing a communication session with a receiving endpoint to which the queue is regulating access, wherein the first endpoint and the receiving endpoint are computing systems;
   while the first communication session request is in the queue:
      presenting recommended communication channel options, along with reasons for recommending the recommended communication channel options, to a user of the first user system;
      receiving a selection of a communication channel from the recommended communication channel options from the user;
      connecting the first endpoint to a communication channel between the first endpoint and a second endpoint having a second communication session request in the queue; and
      exchanging user communications between the first endpoint and the second endpoint over the communication channel.

2. The method of claim 1, wherein the second endpoint is one of multiple other endpoints having communication session requests in the queue and wherein the communication channel connects the first endpoint to the multiple other endpoints.

3. The method of claim 2, wherein:
   presenting the recommended communication channel options comprises presenting a first user of the first endpoint with a graphical interface that identifies the multiple other endpoints; and
   receiving the selection comprises receiving a user selection of the second endpoint from the first user via the graphical interface.

4. The method of claim 1, comprising:
   receiving an offer from a first user of the first endpoint, wherein the offer indicates consideration that the first user is willing to provide a second user of the second endpoint in exchange for a position of the second communication session request in the queue.

5. The method of claim 4, comprising:
   in response to receiving an indication from the second endpoint that the second user has accepted the offer, moving the first communication session request into the position of the second communication session request in the queue.

6. The method of claim 5, wherein moving the first communication session request comprises:
   swapping queue positions between the first communication session request and the second communication session request.

7. The method of claim 4, comprising:
   presenting the first user with a graphical interface to input the offer via the first endpoint.

8. The method of claim 1, comprising:
   including the communication channel in the recommended communication channel options based on the first communication session request and the second communication session request both being associated with a similar topic.

9. The method of claim 1, comprising:
   in response to determining that the first communication session request is next for removal from the queue, presenting a first user of the first endpoint with an option to keep the first communication session request in the queue.

10. The method of claim 9, comprising:
    in response to the first user selecting the option, continuing to exchange the user communications between the first endpoint and the second endpoint over the communication channel.

11. An apparatus comprising:
    one or more computer readable storage media;
    a processing system operatively coupled with the one or more computer readable storage media; and
    program instructions stored on the one or more computer readable storage media that, when read and executed by the processing system, direct the processing system to:

determine that a first communication session request from a first endpoint is in a queue for establishing a communication session with a receiving endpoint to which the queue is regulating access, wherein the first endpoint and the receiving endpoint are computing systems;

while the first communication session request is in the queue:
present recommended communication channel options, along with reasons for recommending the recommended communication channel options, to a user of the first user system;
receive a selection of a communication channel from the recommended communication channel options from the user;
connect the first endpoint to a communication channel between the first endpoint and a second endpoint having a second communication session request in the queue; and
exchange user communications between the first endpoint and the second endpoint over the communication channel.

12. The apparatus of claim 11, wherein the second endpoint is one of multiple other endpoints having communication session requests in the queue and wherein the communication channel connects the first endpoint to the multiple other endpoints.

13. The apparatus of claim 12, wherein:
to present the recommended communication channel options, the program instructions direct the processing system to present a first user of the first endpoint with a graphical interface that identifies the multiple other endpoints; and
to receive the selection, the program instructions direct the processing system to receive a selection of the second endpoint from the first user via the graphical interface.

14. The apparatus of claim 11, wherein the program instructions direct the processing system to:
receive an offer from a first user of the first endpoint, wherein the offer indicates consideration that the first user is willing to provide a second user of the second endpoint in exchange for a position of the second communication session request in the queue.

15. The apparatus of claim 14, wherein the program instructions direct the processing system to:
in response to receiving an indication from the second endpoint that the second user has accepted the offer, move the first communication session request into the position of the second communication session request in the queue.

16. The apparatus of claim 15, wherein to move the first communication session request, the program instructions direct the processing system to:
swap queue positions between the first communication session request and the second communication session request.

17. The apparatus of claim 14, wherein the program instructions direct the processing system to:
present the first user with a graphical interface to input the offer via the first endpoint.

18. The apparatus of claim 11, wherein the program instructions direct the processing system to:
include the communication channel in the recommended communication channel options based on the first communication session request and the second communication session request both being associated with a similar topic.

19. The apparatus of claim 11, wherein the program instructions direct the processing system to:
in response to determining that the first communication session request is next for removal from the queue, present a first user of the first endpoint with an option to keep the first communication session request in the queue; and
in response to the first user selecting the option, continue to exchange the user communications between the first endpoint and the second endpoint over the communication channel.

20. One or more computer readable storage media having program instructions stored thereon that, when read and executed by a processing system, direct the processing system to:
determine that a first communication session request from a first endpoint is in a queue for establishing a communication session with a receiving endpoint to which the queue is regulating access, wherein the first endpoint and the receiving endpoint are computing systems;
while the first communication session request is in the queue:
present recommended communication channel options, along with reasons for recommending the recommended communication channel options, to a user of the first user system;
receive a selection of a communication channel from the recommended communication channel options from the user;
connect the first endpoint to a communication channel between the first endpoint and a second endpoint having a second communication session request in the queue; and
exchange user communications between the first endpoint and the second endpoint over the communication channel.

* * * * *